(12) United States Patent
Anspann et al.

(10) Patent No.: US 8,439,786 B2
(45) Date of Patent: May 14, 2013

(54) ELECTRIC DRIVE FOR A MOBILE VEHICLE

(75) Inventors: Stefan Anspann, Nuremberg (DE); Robert Pauli, Salzweg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 399 days.

(21) Appl. No.: 12/747,223

(22) PCT Filed: Nov. 17, 2008

(86) PCT No.: PCT/EP2008/065641
§ 371 (c)(1),
(2), (4) Date: Jun. 10, 2010

(87) PCT Pub. No.: WO2009/074429
PCT Pub. Date: Jun. 18, 2009

(65) Prior Publication Data
US 2010/0261566 A1  Oct. 14, 2010

(30) Foreign Application Priority Data
Dec. 12, 2007  (DE) .................. 10 2007 055 767

(51) Int. Cl.
*F16H 37/08* (2006.01)
*F16H 57/02* (2006.01)

(52) U.S. Cl.
USPC .......................... 475/200; 74/606 R

(58) Field of Classification Search .......... 475/198, 475/200, 149, 150, 230; 74/606 R
See application file for complete search history.

(56) References Cited

U.S. PATENT DOCUMENTS

| | | | |
|---|---|---|---|
| 2,962,916 A * | 12/1960 | Koelsch ................. | 475/86 |
| 3,992,956 A * | 11/1976 | Fischer ................. | 74/29 |
| 5,295,413 A | 3/1994 | Sherman | |
| 5,352,164 A | 10/1994 | Bensinger et al. | |
| 5,821,653 A | 10/1998 | Kinto et al. | |
| 5,832,789 A * | 11/1998 | Kinto et al. ........... | 74/606 R |
| 6,302,227 B1 | 10/2001 | Takemura et al. | |
| 6,383,114 B1 | 5/2002 | Hoshiya et al. | |
| 6,398,685 B1 | 6/2002 | Wachauer et al. | |
| 6,499,549 B2 | 12/2002 | Mizon et al. | |
| 6,666,103 B2 | 12/2003 | Gotoh | |
| 7,775,131 B2 * | 8/2010 | Becker et al. .......... | 74/89.23 |
| 2005/0143210 A1 * | 6/2005 | Hamai et al. .......... | 475/150 |
| 2006/0063634 A1 * | 3/2006 | Szuba .................. | 475/230 |
| 2010/0285915 A1 * | 11/2010 | Anspann et al. ....... | 475/150 |

FOREIGN PATENT DOCUMENTS

| | | |
|---|---|---|
| DE | 42 17 313 A1 | 12/1993 |
| DE | 100 49 514 A1 | 7/2001 |
| EP | 0 811 521 A1 | 12/1997 |
| EP | 1 177 929 A2 | 2/2002 |
| EP | 1 293 373 A2 | 3/2003 |
| WO | 99/36286 A1 | 7/1999 |
| WO | 2006/122649 A2 | 11/2006 |
| WO | 2007/131616 A2 | 11/2007 |

* cited by examiner

*Primary Examiner* — Roger Pang
(74) *Attorney, Agent, or Firm* — Davis & Bujold, PLLC

(57) ABSTRACT

An electric drive for a mobile vehicle comprises an electric motor (1) which powers a differential via a spur gear mechanism (3, 4, 6, 7). The electric motor (1), the spur gear mechanism (3, 4, 6, 7) and the differential (9) are each accommodated within a housing comprising three main housing portions (12, 13, 14), namely, a central housing portion (12), a first covering housing portion (13) and a second covering housing portion (14).

16 Claims, 4 Drawing Sheets

US 8,439,786 B2

ELECTRIC DRIVE FOR A MOBILE VEHICLE

This application is a National Stage completion of PCT/EP2008/065641 filed Nov. 17, 2008, which claims priority from German patent application serial no. 10 2007 055 767.3 filed Dec. 12, 2007.

FIELD OF THE INVENTION

Electric drives for mobile vehicles are used for example as stand-alone drives or as auxiliary drives for rear axles in passenger cars.

BACKGROUND OF THE INVENTION

DE 100 49 514 B4 discloses an electric drive for a rear axle of a passenger car in which, via a spur gear mechanism, an electric drive motor powers a differential whose drive outputs drive the wheels of the vehicle.

SUMMARY OF THE INVENTION

The purpose of the present invention is to provide an electric drive for a mobile vehicle, which can be constructed inexpensively and fitted simply.

This objective is achieved with an electric drive of the type concerned which also comprises the characterizing features specified in the principal claim.

The electric drive comprises an electric motor which, via a spur gear mechanism and a differential, powers two drive outputs of the differential by which, for example by means of splined shafts, the wheels of the vehicle are driven.

The electric drive has a housing which accommodates the differential, the spur gear mechanism and the electric motor. The housing consists of a central housing portion which accommodates on the one hand the electric motor and, on the other hand, essentially the spur gear mechanism and the differential. At the two ends of the central housing portion are fixed covering housing portions which enclose the central housing portion. The central housing portion has on one side a cylindrical expanded section in which the motor is arranged, and on the other side another expanded section parallel to the cylindrical expanded section in which the spur gear mechanism and the differential are arranged. This provides a height offset between the motor shaft of the electric motor and the drive outputs or the drive axles connected thereto.

In a further design form of the invention cooling ducts are formed in the central housing portion in order to cool the electric motor.

Preferably, four main cooling ducts are arranged in the central housing portion parallel to the rotational axis of the driveshaft of the electric motor, these being designed in such a manner that they occupy the structural space between the round rotor of the electric motor and the square outer contour of the central housing portion that encloses the electric motor. To ensure a flow of coolant through the housing and configure the housing so that it can be produced as a casting, at the two end sides of the central housing portion there are two connecting ducts arranged perpendicularly to the rotational axis of the driveshaft of the electric motor, each of which connects two main cooling ducts to one another and which, when they have been drilled, are closed off by sealing plugs. At one of the two ends is the coolant feed, from which coolant passes into one of the four main cooling ducts. In this main cooling duct the coolant flows through the central housing portion to the other end, then through the connecting duct into another main cooling duct and back again through the main housing portion to the first end, where it is again deflected. The coolant flows back and forth through the ducts in this way until it finally emerges through the return port, which is located on the same side as the coolant feed. Thus, the coolant follows a meandering path through the central housing portion.

In another embodiment of the invention the central housing portion has connection terminals for the power electronics for the electric motor. In addition, sealing elements can be arranged between the electric motor and the spur gear mechanism so that the electric motor is kept free from oil.

The spur gear mechanism can consist of four spur gears, one spur gear being connected in a rotationally fixed manner to the motor shaft of the electric motor and being in active engagement with a second spur gear, which is connected in a rotationally fixed manner to a third spur gear that is mounted to rotate via an intermediate shaft, such that the third spur gear is in active connection with a fourth spur gear which, finally, is connected in a rotationally fixed manner to the differential. The fourth spur gear can be connected to a differential cage of the differential by a continuous-material joint such as welding or brazing.

In a further embodiment the motor shaft is connected integrally with the first spur gear, so that the first spur gear and the motor shaft only have to be mounted at two bearing points. If in addition a parking lock is used, in which the parking lock gearwheel is arranged on the motor shaft, then the motor shaft is mounted at three bearing points, namely with one bearing at one end of the motor shaft, another bearing at the other end of the motor shaft, and a bearing between the rotor of the motor and the first spur gear.

BRIEF DESCRIPTION OF THE DRAWINGS

Other features emerge from the description of the figures, which show.

DETAILED DESCRIPTION OF THE PREFERRED EMBODIMENTS

FIG. 1:

With its motor shaft 2 an electric motor 1 drives a first spur gear 3.

Figure 1:
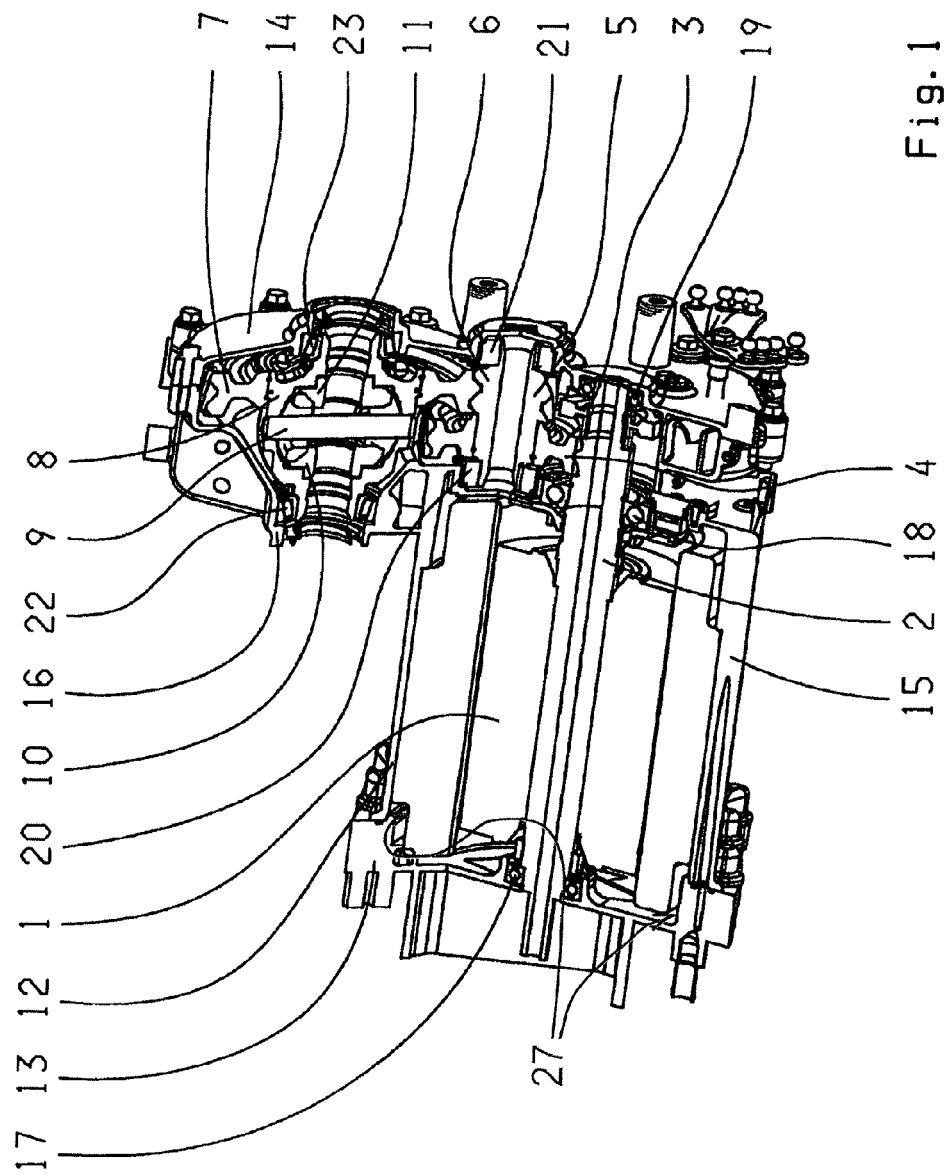
FIG. 1: Sectional view through the electric drive.
Figure 2:
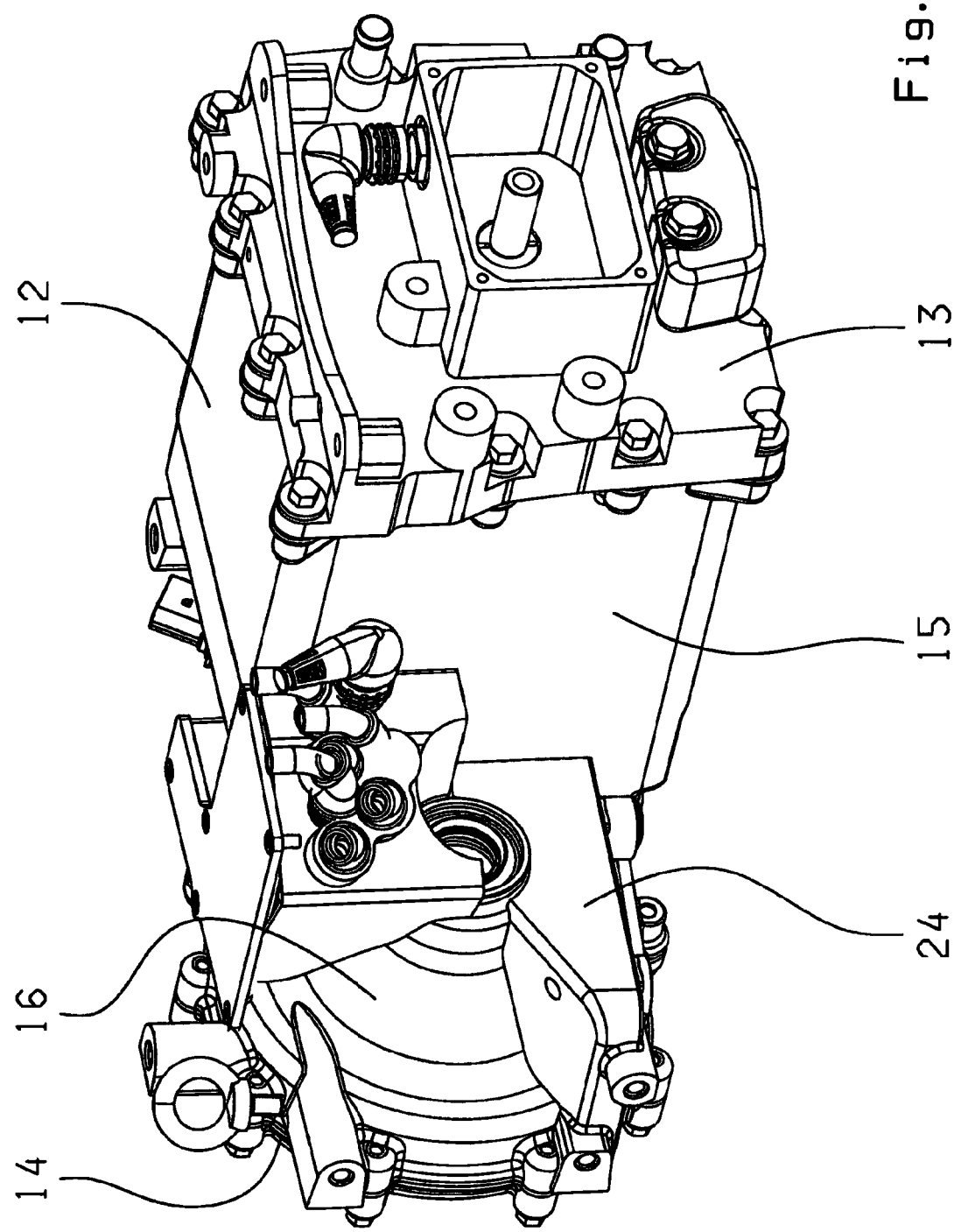
FIG. 2: Rear view of the electric drive.
Figure 3:
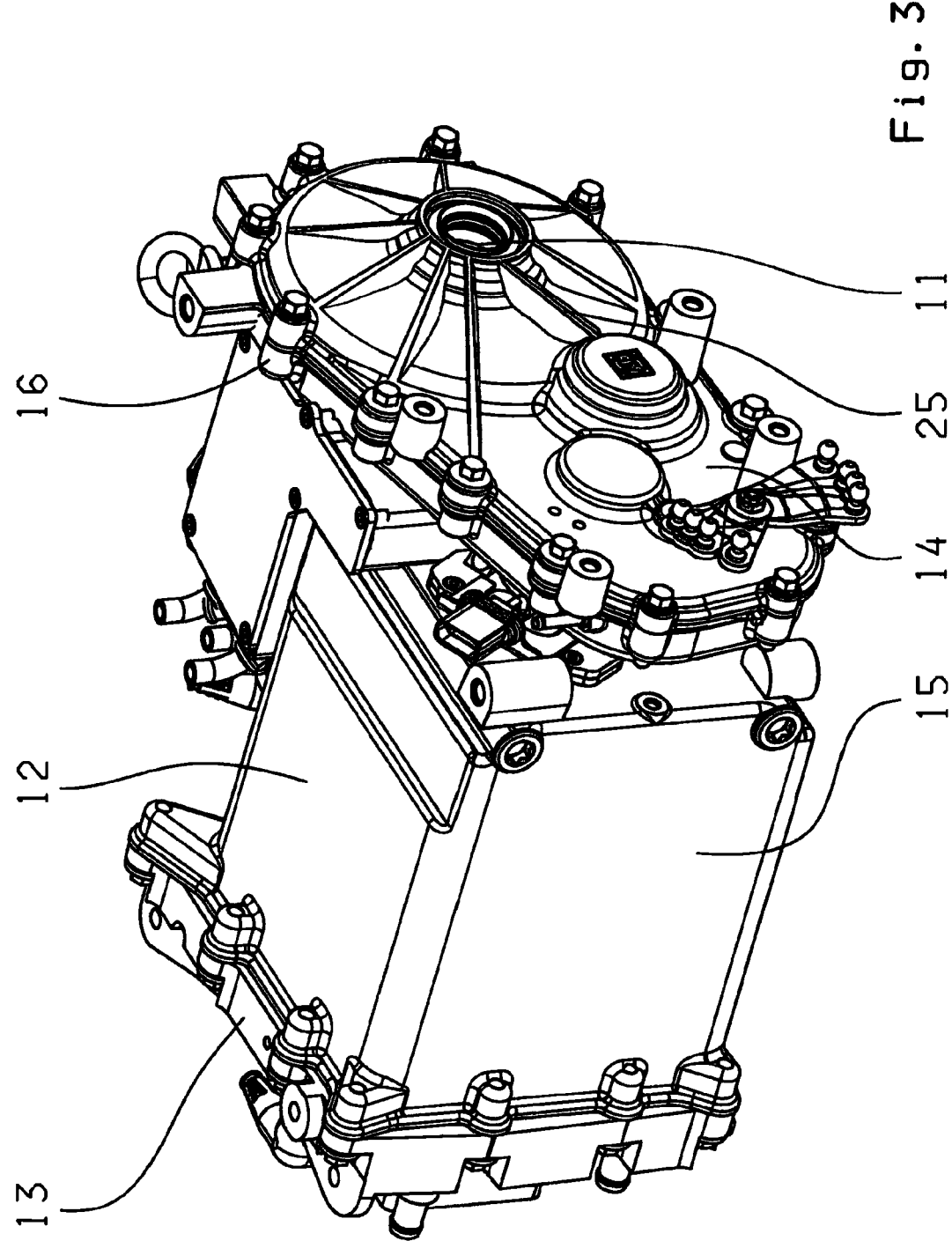
FIG. 3: Front view of the electric drive.
Figure 4:
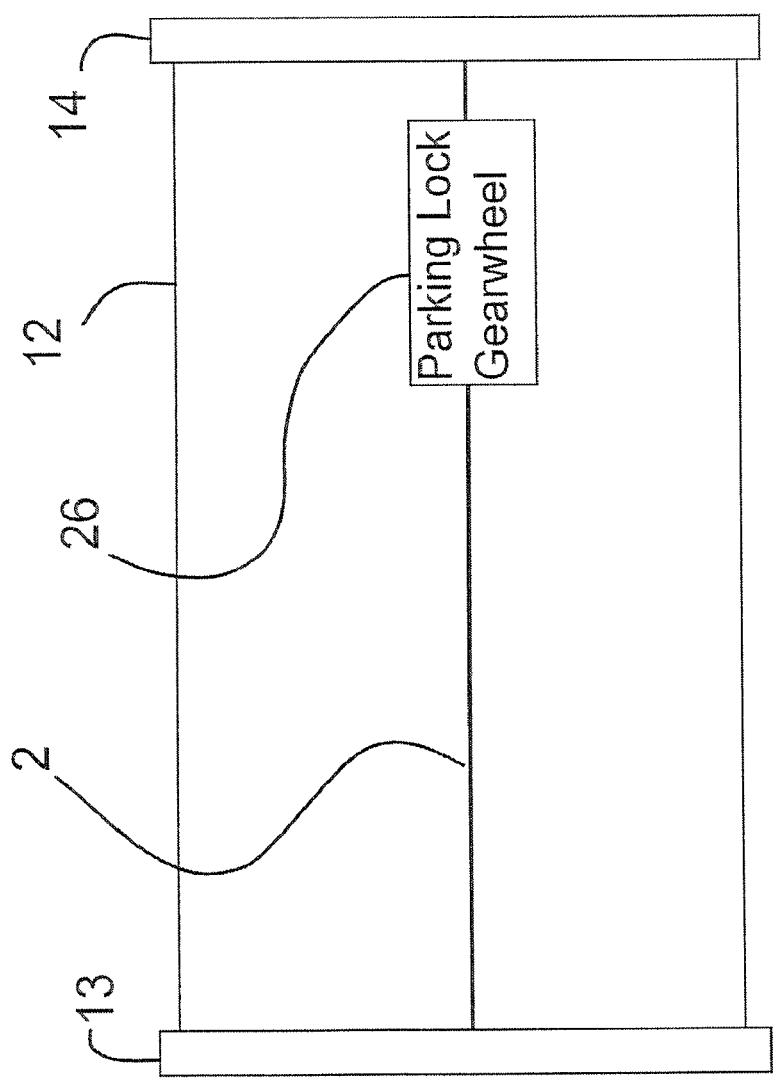
FIG. 4: A schematic view of the electric drive including a parking lock gearwheel.

The first spur gear 3 is in active engagement with a second spur gear 4 which, via an intermediate shaft 5, is connected in a rotationally fixed manner to a third spur gear 6. The third spur gear 6 is in active engagement with a fourth spur gear 7, which is connected in a rotationally fixed manner to a differential cage 8 of a differential 9. Vehicle wheels can be driven by a first drive output 10 and a second drive output 11. The housing of the electric drive consists of a central housing portion 12, a first covering housing portion 13 and a second covering housing portion 14. The covering housing portion 13 is arranged at one end of the central housing portion 12 and the covering housing portion 14 at the other end of the central housing portion 12. The central housing portion 12 consists of a cylindrical expanded section 15 in which the motor 1 is accommodated, and another expanded section 16 parallel to the cylindrical expanded section 15, in which the differential is accommodated. The motor shaft 2 is mounted on one side in a bearing 17 in the first covering housing portion 13 and on the other side in bearings 18 and 19, respectively in the central housing portion 12 and in the second covering housing portion 14. As diagrammatically shown in FIG. 4, a parking lock gearwheel 26 may be on the motor shaft 2. If there is no parking lock gearwheel 26 on the motor shaft 2, then the motor shaft 2 and the spur gear 3 connected integrally to it can also be mounted only in the bearings 17 in the housing portion and 18 in the central housing portion 12. Thus, the bearing 19 can be omitted. The intermediate shaft 5 is mounted on one side in a bearing 20 in the central housing portion 12 and in a bearing 21 in the second covering housing portion 14. The differential 9 is mounted in bearings 22 and 23, respectively in the central housing portion 12 and in the second covering housing portion 14. The first spur gear is arranged in the axial direction along the motor shaft between the electric motor 1 and the fourth spur gear 7. In a further design form of the invention cooling ducts 27 are formed in the central housing portion 12 in order to cool the electric motor 1.

FIG. 2:

In the area of the differential 9, the central housing portion 12 has a reinforcing web 24, which connects the expanded section 16 to the cylindrical expanded section 15.

FIG. 3:

In the area of the differential 9, the second covering housing portion 14 has reinforcing ribs 25, which extend radially around the rotational axis of the second drive output 11.

Indexes

1 Electric motor
2 Motor shaft
3 First spur gear
4 Second spur gear
5 Intermediate shaft
6 Third spur gear
7 Fourth spur gear
8 Differential cage
9 Differential
10 First drive output
11 Second drive output
12 Central housing portion
13 First covering housing portion
14 Second covering housing portion
15 Cylindrical expanded section
16 Expanded section
17 Bearing
18 Bearing
19 Bearing
20 Bearing
21 Bearing
22 Bearing
23 Bearing
24 Bearing
25 Ribs

The invention claimed is:

1. An electric drive for a mobile vehicle with an electric motor (1) which powers first and second drive outputs (10, 11), via a spur gear mechanism (3, 4, 6, 7) and a differential (9) and a housing encloses the differential (9), the spur gear mechanism (3, 4, 6, 7) and the electric motor (1);

the housing comprising a central housing portion (12), a first covering housing portion (13) and a second covering housing portion (14) such that the central housing portion (12) being a one-piece housing comprising a cylindrical expanded section (15) accommodating the electric motor (1), the central housing portion (12) being closed at one end by the first covering housing portion (13) and having, at an opposite end, an expanded section (16) extending parallel to the cylindrical expanded section (15), in which the differential (9) and the spur gear mechanism (3, 4, 6, 7) are accommodated, and the expanded section (16) being closed by the second covering housing portion (14);

the electric motor (1) comprising a motor shaft (2) such that the motor shaft (2) is mounted in the central housing portion (12), the motor shaft (2) being also supported by and rotatable relative to the first covering housing portion (13) and supported by and rotatable relative to the second covering housing portion (14), and the motor shaft (2) and a first spur gear (3) being integrally connected with one another;

a parking lock gearwheel (26) of a parking lock being arranged on the motor shaft (2);

the central housing portion (12) having a reinforcing web (24) which connects the expanded section (16) to the cylindrical expanded section (15); and the reinforcing web supports a plurality of ports, which lead into the reinforcing web, and fixes a housing cover perpendicular to the second covering housing portion.

2. The electric drive according to claim 1, wherein the spur gear mechanism comprises the first spur gear (3), and a second, a third and a fourth spur gears (4, 6, 7), the first spur gear (3) is connected, in a rotationally fixed manner, to the motor shaft (2), the second spur gear (4) is in active engagement with the first spur gear (3) and is connected, in a rotationally fixed manner, to an intermediate shaft (5), the third spur gear (6) is also connected, in a rotationally fixed manner, to the intermediate shaft (5) and is in active engagement with the fourth spur gear (7), and the fourth spur gear (7) is connected, in a rotationally fixed manner, to the differential (9), and the first and the second spur gears (3, 4) are located between and separate and space the third and the fourth spur gears (6, 7) from the central housing portion (12) so that the first and the second spur gears (3, 4) are located closer to the central housing portion (12) than the third and the fourth spur gears (6, 7) while the third and the fourth spur gears (6, 7) are located closer to the second covering housing portion (14) than the first and the second spur gears (3, 4).

3. The electric drive according to claim 1, wherein an intermediate shaft (5) is mounted to rotate in both the second covering housing portion (14) and the central housing portion (12).

4. The electric drive according to claim 1, wherein the differential (9) is mounted to rotate in both the second covering housing portion (14) and the central housing portion (12).

5. The electric drive according to claim 1, wherein rotational axes of the first and the second drive outputs (10, 11) are orientated parallel to a rotational axis of the motor shaft (2).

6. The electric drive according to claim 1, wherein cooling ducts are arranged in the central housing portion (12).

7. The electric drive according to claim 1, wherein the fourth spur gear (7) is connected, by a continuous-material joint, to a differential cage (8) of the differential (9).

8. The electric drive according to claim 1, wherein a first bearing point (19) of the motor shaft (2) is arranged at one end of the motor shaft (2), a second bearing point (18) is arranged between a rotor of the electric motor (1) and a first spur gear (3), and a third bearing point (17) is arranged at an other end of the motor shaft (2).

9. The electric drive according to claim 1, wherein four main cooling ducts (27), arranged parallel to a rotational axis of the motor shaft (2), are located within the central housing portion (12), the four main cooling ducts (27) are located between a round rotor of the electric motor (1) and a square outer contour of the central housing portion (12) which encloses the electric motor (1).

10. The electric drive according to claim 1, wherein the reinforcing web (24) fixes the expanded section (16) such that the expanded section rotationally supports the first drive output.

11. The electric drive according to claim 2, wherein the first and the second spur gears (3, 4) define a plane which is substantially coincide with a midpoint of the differential (9).

12. An electric drive for a mobile vehicle comprising:
an electric motor (1) which powers first and second drive outputs (10, 11) via first, second, third and fourth spur gears (3, 4, 6, 7) and a differential (9),
a housing encloses the differential (9), the first, the second, the third and the fourth spur gears (3, 4, 6, 7) and the motor (1), the housing comprising a central housing portion (12), a first covering housing portion (13) and a second covering housing portion (14), the central housing portion (12) comprises a cylindrical expanded section (15) accommodating the electric motor (1), a first end of the central housing portion (12) being enclosed by the first covering housing portion (13) and an opposite second end of the central housing portion (12) comprising a second expanded section (16) that expands parallel to the cylindrical expanded section (15), the differential (9) and the first, the second, the third and the fourth spur gears (3, 4, 6, 7) being accommodated within the second expanded section (16), the second expanded section (16) being enclosed by the second covering housing portion (14), the motor (1) comprising a motor shaft (2) which is rotationally supported by a bearing (17) in the first covering housing portion (13) and another bearing (19) in the second covering housing portion (14),
the motor shaft (2) and the first spur gear (3) are integrally connected to one another,
the central housing portion (12) having a reinforcing web (24) which connects the expanded section (16) to the cylindrical expanded section (15);
the motor shaft (2) extending through a through-hole in the first covering housing portion (13),
a parking lock gearwheel (26) of a parking lock is arranged on the motor shaft (2); and
the reinforcing web supports a plurality of ports, which lead into the reinforcing web, and fixes a housing cover perpendicularly to the second covering housing portion.

13. The electric drive according to claim 12, wherein the reinforcing web (24) fixes the expanded section (16) such that the expanded section rotationally supports the first drive output.

14. The electric drive according to claim 12, wherein the second covering housing portion (14) has reinforcing ribs (25), located the differential (9), which extend radially around a rotational axis of the second drive output (11).

15. The electric drive according to claim 12, wherein the spur gear mechanism comprises the first spur gear (3), and second, third and fourth spur gears (4, 6, 7), the first spur gear (3) is connected, in a rotationally fixed manner, to the motor shaft (2), the second spur gear (4) is in active engagement with the first spur gear (3) and is connected, in a rotationally fixed manner, with an intermediate shaft (5), the third spur gear (6) is also connected, in a rotationally fixed manner, to the intermediate shaft (5) and is in active engagement with the fourth spur gear (7), and the fourth spur gear (7) is connected, in a rotationally fixed manner, to the differential (9), and the first and the second spur gears (3, 4) are located between and separate and space the third and the fourth spur gears (6, 7) from the central housing portion (12) so that the first and the second spur gears (3, 4) are located closer to the central housing portion (12) than the third and the fourth spur gears (6, 7) while the third and the fourth spur gears (6, 7) are located closer to the second covering housing portion (14) than the first and the second spur gears (3, 4).

16. An electric drive for a mobile vehicle with an electric motor (1) which powers first and second drive outputs (10, 11), via a spur gear mechanism (3, 4, 6, 7) and a differential (9), and a housing encloses the differential (9), the spur gear mechanism (3, 4, 6, 7) and the electric motor (1);
the housing comprising a central housing portion (12), a first covering housing portion (13) and a second covering housing portion (14) such that the central housing portion (12) being a one-piece housing comprising a cylindrical expanded section (15) accommodating the electric motor (1);
the central housing portion (12) being closed at one end by the first covering housing portion (13) and having, at an opposite end, an expanded section (16) extending parallel to the cylindrical expanded section (15), in which the differential (9) and the spur gear mechanism (3, 4, 6, 7) are accommodated;
the expanded section (16) being closed by the second covering housing portion (14);
the electric motor (1) comprising a motor shaft (2) such that the motor shaft (2) is mounted in the central housing portion (12);
the motor shaft (2) being also supported by and rotatable relative to the first covering housing portion (13) and supported by and rotatable relative to the second covering housing portion (14), and the motor shaft (2) and a first spur gear (3) being integrally connected with one another;
the motor shaft (2) extending through a through-hole in the first covering housing portion (13);
a parking lock gearwheel (26) of a parking lock being arranged on the motor shaft (2);
the spur gear mechanism comprising the first spur gear (3), and second, third and fourth spur gears (4, 6, 7), the first spur gear (3) being connected, in a rotationally fixed manner, to the motor shaft (2), the second spur gear (4) being in active engagement with the first spur gear (3) and being connected, in a rotationally fixed manner, with an intermediate shaft (5), the third spur gear (6) also being connected, in a rotationally fixed manner, to the intermediate shaft (5) and being in active engagement with the fourth spur gear (7), and the fourth spur gear (7) being connected, in a rotationally fixed manner, to the differential (9), and the first and the second spur gears (3, 4) are located between and separate and space the third and the fourth spur gears (6, 7) from the central housing portion (12) so that the first and the second spur gears (3, 4) are located closer to the central housing portion (12) than the third and the fourth spur gears (6, 7) while the third and the fourth spur gears (6, 7) are located closer to the second covering housing portion (14) than the first and the second spur gears (3, 4);
the central housing portion (12) having a reinforcing web (24) which connects the expanded section (16) to the cylindrical expanded section (15), the reinforcing web supports a plurality of ports, which lead into the reinforcing web, and fixes a housing cover perpendicular to the second covering housing portion;

the second covering housing portion (14) has reinforcing ribs (25), adjacent of the differential (9), which extend radially around a rotational axis of the second drive output (11); and the first and the second spur gears (3, 4) define a plane which is substantially coincide with a midpoint of the differential (9).

\* \* \* \* \*